(12) United States Patent
Otsuki (10) Patent No.: US 11,696,066 B2
(45) Date of Patent: Jul. 4, 2023

(54) SPEAKER DEVICE AND PROJECTOR

(71) Applicant: SEIKO EPSON CORPORATION, Tokyo (JP)

(72) Inventor: Nobuyuki Otsuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/697,422

(22) Filed: Mar. 17, 2022

(65) Prior Publication Data

US 2022/0303670 A1 Sep. 22, 2022

(30) Foreign Application Priority Data

Mar. 17, 2021 (JP) .................................. 2021-043314

(51) Int. Cl.
*H04R 1/28* (2006.01)
*H04R 1/02* (2006.01)
*H04R 1/24* (2006.01)

(52) U.S. Cl.
CPC ........... *H04R 1/2834* (2013.01); *H04R 1/025* (2013.01); *H04R 1/028* (2013.01); *H04R 1/24* (2013.01); *H04R 1/2826* (2013.01); *H04R 2499/15* (2013.01)

(58) Field of Classification Search
CPC ...... H04R 1/2834; H04R 1/025; H04R 1/028; H04R 1/24; H04R 2499/15
USPC ....................................................... 381/345
See application file for complete search history.

(56) References Cited

U.S. PATENT DOCUMENTS

| | | | |
|---|---|---|---|
| 2004/0131219 A1* | 7/2004 | Polk, Jr. ............... | H04R 1/2826 381/345 |
| 2005/0018868 A1* | 1/2005 | Chick .................. | H04R 1/2834 381/349 |
| 2006/0078136 A1* | 4/2006 | Stiles ..................... | H04R 1/345 381/345 |
| 2007/0092096 A1* | 4/2007 | Litovsky .............. | H04R 1/2834 381/349 |
| 2007/0201712 A1 | 8/2007 | Saiki | |
| 2009/0245561 A1* | 10/2009 | Litovsky .............. | H04R 1/2834 381/345 |
| 2010/0027815 A1* | 2/2010 | Burge .................. | H04R 1/2834 381/386 |

(Continued)

FOREIGN PATENT DOCUMENTS

| | | |
|---|---|---|
| JP | H02-301395 A | 12/1990 |
| JP | 4861825 B | 3/2006 |

(Continued)

*Primary Examiner* — Sean H Nguyen
(74) *Attorney, Agent, or Firm* — Dority & Manning, P.A.

(57) ABSTRACT

A speaker device of the present disclosure includes a speaker unit, a first passive radiator disposed adjacent to a vibrating plate of the speaker unit, a second passive radiator located in a first direction with respect to the first passive radiator and disposed to be opposed to the first passive radiator, a first cabinet including a first wall section and forming a sealed acoustic space, and a second cabinet including a second wall section, including an opening section adjacent to the first passive radiator, and forming an opened acoustic space. The second passive radiator is located in a second direction with respect to a first imaginary surface passing the first wall section of the first cabinet. The second wall section of the second cabinet does not project in the first direction with respect to the first wall section.

8 Claims, 6 Drawing Sheets

(56) References Cited

U.S. PATENT DOCUMENTS

2016/0353198 A1\* 12/2016 Sahyoun .............. H04R 1/2826

FOREIGN PATENT DOCUMENTS

| JP | 2008-294841 A | 12/2008 |
|----|---------------|---------|
| JP | 2009-284157 A | 12/2009 |

\* cited by examiner

SPEAKER DEVICE AND PROJECTOR

The present application is based on, and claims priority from JP Application Serial Number 2021-043314, filed Mar. 17, 2021, the disclosure of which is hereby incorporated by reference herein in its entirety.

BACKGROUND

1. Technical Field

The present disclosure relates to a speaker device and a projector.

2. Related Art

There has been known a speaker device including a passive radiator for intensifying sound in the lower register. JP-A-2008-294841 (Patent Literature 1) discloses a speaker system including a speaker unit and a plurality of passive radiators adjacent to the speaker unit.

JP-A-2-301395 (Patent Literature 2) discloses a speaker system including a speaker unit, a partition plate extending in a direction orthogonal to the front surface of the speaker unit, and a passive radiator provided in the partition plate.

JP-A-2009-284157 (Patent Literature 3) discloses a speaker device including a cabinet, speaker units respectively provided on different surfaces of the cabinet, and a plurality of passive radiators.

In the speaker system of Patent Literature 1, since the speaker unit and all of the plurality of passive radiators are disposed side by side on the front surface of the cabinet, the plurality of passive radiators vibrate in the same phase. As a result, it is likely that vibration of the cabinet is large and chattering sound occurs.

In the speaker system of Patent Literature 2, since an extending direction of the passive radiator is orthogonal to the front surface of the cabinet, the dimension in the depth direction of the speaker system is large. Therefore, when the speaker system is incorporated in other equipment, it is likely that great restriction occurs in the disposition of the speaker system and the equipment increases in size.

In the speaker device of Patent Literature 3, a sealed acoustic space surrounded by the speaker unit and the plurality of passive radiators is formed. Therefore, bass intensified by the passive radiators is not effectively output.

SUMMARY

A speaker device according to an aspect of the present disclosure includes: a speaker unit including a vibrating plate, a yoke, and a center axis passing the vibrating plate and the yoke; a first passive radiator disposed adjacent to the vibrating plate along a direction crossing the center axis; a second passive radiator located in, when a direction from the vibrating plate to the yoke along the center axis is represented as a first direction and a direction from the yoke to the vibrating plate along the center axis is represented as a second direction, the first direction with respect to the first passive radiator and disposed to be opposed to the first passive radiator; a first cabinet including a first wall section opposed to the yoke in the first direction and forming a sealed acoustic space common to the speaker unit, a first passive radiator, and the second passive radiator; and a second cabinet including a second wall section opposed to the second passive radiator in the first direction, including an opening section adjacent to the first passive radiator along a direction crossing the center axis, and forming an opened acoustic space between the second passive radiator and the second wall section. The second passive radiator is located in the second direction with respect to a first imaginary surface passing the first wall section of the first cabinet. The second wall section of the second cabinet does not project in the first direction with respect to the first wall section.

A projector according to an aspect of the present disclosure includes: the speaker device according to the aspect of the present disclosure; and an exterior case housing the speaker device. The speaker device is disposed along an inner wall surface of the exterior case.

DESCRIPTION OF EXEMPLARY EMBODIMENTS

First Embodiment

A first embodiment of the present disclosure is explained below with reference to FIG. 1.

Figure 1:
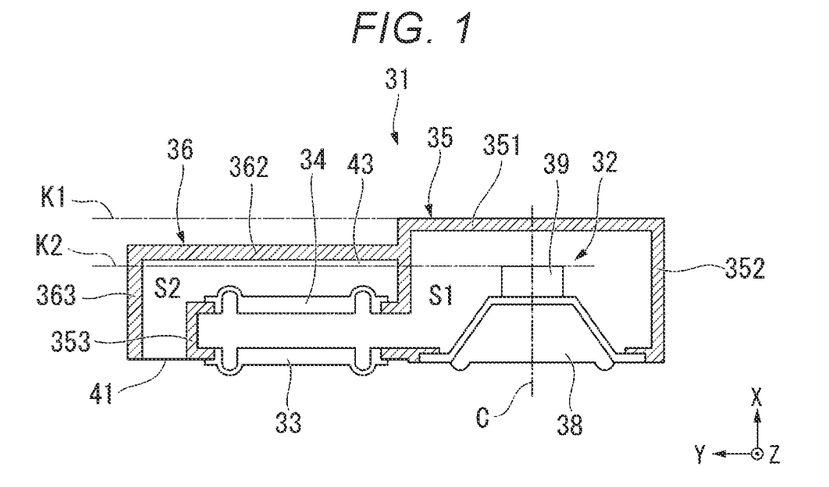
FIG. 1 is a schematic configuration diagram of a speaker device in a first embodiment.

FIG. 1 is a schematic diagram showing a schematic configuration of a speaker device in this embodiment.

In the drawings referred to below, scales of dimensions are sometimes shown to be different depending on components in order to clearly show the components.

In the drawings used in this specification, an XYZ orthogonal coordinate system is used according to necessity. An X axis is an axis extending along a direction in which a sound wave is radiated from a speaker unit 32 and is an axis parallel to a center axis C of the speaker unit 32 explained below. A Y axis is an axis orthogonal to the X axis and extending along a direction (the left-right direction) in which the speaker unit 32 and a pair of passive radiators 33 and 34 are disposed side by side. A Z axis is an axis orthogonal to the X axis and the Y axis and extending along the up-down direction.

In this embodiment, a direction from a vibrating plate 38 to a yoke 39 along the center axis C of the speaker unit 32 (the X axis) is referred to as rear and indicated by +X. A direction from the yoke 39 to the vibrating plate 38 is referred to as front and indicated by −X. A direction from the speaker unit 32 to the pair of passive radiators 33 and 34 along the Y axis is indicated by +Y. A direction from the pair of passive radiators 33 and 34 to the speaker unit 32 is indicated by −Y. A direction upward from below a speaker device 31 is indicated by +Z. A direction downward from above the speaker device 31 is indicated by −Z.

The rear in this embodiment corresponds to the first direction in the claims. The front in this embodiment corresponds to the second direction in the claims.

As shown in FIG. 1, the speaker device 31 in this embodiment includes the speaker unit 32, a first passive radiator 33, a second passive radiator 34, a first cabinet 35, and a second cabinet 36.

The speaker unit 32 includes the vibrating plate 38, the yoke 39, and the center axis C passing the vibrating plate 38 and the yoke 39. The vibrating plate 38 generates a sound wave with vibration of the vibrating plate 38 itself. The yoke 39 configures a part of a magnetic circuit and functions as a base member that supports the entire speaker unit 32. The speaker unit 32 is set in a direction in which the vibrating plate 38 is located in the front and the yoke 39 is located in the rear. The speaker unit 32 includes a voice coil and a magnet besides the components explained above. However, since the voice coil, the magnet, and the like are general components, explanation thereof is omitted. The center axis C of the speaker unit 32 is defined as an axis passing the center of the vibrating plate 38 and the center of the yoke 39 when viewed from a radiating direction of a sound wave (an X-axis direction).

The first passive radiator 33 is disposed adjacent to the vibrating plate 38 of the speaker unit 32 along a Y-axis direction crossing the center axis C of the speaker unit 32.

The second passive radiator 34 is located in the rear with respect to the first passive radiator 33 and is disposed to be opposed to the first passive radiator 33. The first passive radiator 33 and the second passive radiator 34 have the same configuration. Each of the first passive radiator 33 and the second passive radiator 34 includes a vibrating plate but does not include a magnetic circuit unlike the speaker unit 32.

The first cabinet 35 is a housing that supports the speaker unit 32, the first passive radiator 33, and the second passive radiator 34. Specifically, the first cabinet 35 includes a first wall section 351 opposed to the rear of the yoke 39 of the speaker unit 32, a first sidewall section 352 that covers a side of the speaker unit 32, and a second sidewall section 353 that covers sides of the first passive radiator 33 and the second passive radiator 34. In this way, the first cabinet 35 is provided to cover the periphery of the speaker unit 32 and the peripheries of the first passive radiator 33 and the second passive radiator 34.

Therefore, an internal space S1 of the first cabinet 35 is the internal space S1 sealed by the speaker unit 32, the first passive radiator 33, the second passive radiator 34, and the first cabinet 35. Consequently, even if the first passive radiator 33 and the second passive radiator 34 do not include a magnetic circuit, the first passive radiator 33 and the second passive radiator 34 vibrate by receiving air vibration generated in the internal space S1 of the first cabinet 35 when the speaker unit 32 operates. In this way, the first cabinet 35 forms a sealed acoustic space S1 common to the speaker unit 32, the first passive radiator 33, and the second passive radiator 34.

The second cabinet 36 includes a second wall section 362 opposed to the rear of the second passive radiator 34 and a third sidewall section 363 that covers sides of the first passive radiator 33 and the second passive radiator 34. The second cabinet 36 includes an opening section 41 adjacent to the first passive radiator 33 along the Y-axis direction crossing the center axis of the speaker unit 32 and forms an opened acoustic space S2 between the second passive radiator 34 and the second wall section 362.

That is, the second cabinet 36 includes a duct 43 that extends along an extending direction of the second passive radiator 34 (the Y-axis direction), bends at an end portion (an end portion on a +Y side) on the opposite side of an end portion (an end portion on a −Y side) on a side where the speaker unit 32 of the second passive radiator 34 is located, and forms the opened acoustic space S2 communicating with the opening section 41.

Positional relations among the components of the speaker device 31 are summarized as follows.

The second passive radiator 34 is located in the front with respect to a first imaginary surface K1 passing the first wall section 351 of the first cabinet 35. The second wall section 362 of the second cabinet 36 does not project to the rear of the first wall section 351. In particular, in the case of this embodiment, the second wall section 362 of the second cabinet 36 is located in the front with respect to the first imaginary surface K1.

The opened acoustic space S2 is parallel to the extending direction of the second passive radiator 34 and is located on a second imaginary surface K2 passing the rear end portion of the speaker unit 32, that is, the rear end face of the yoke 39.

Effects of the First Embodiment

The speaker device 31 in this embodiment includes the speaker unit 32 including the vibrating plate 38 and the yoke 39, the first passive radiator 33 disposed adjacent to the vibrating plate 38 along the direction crossing the center axis C of the speaker unit 32, the second passive radiator 34 located in the rear with respect to the first passive radiator 33 and disposed to be opposed to the first passive radiator 33, the first cabinet 35 including the first wall section 351 opposed to the rear of the yoke 39 and forming the sealed acoustic space S1 common to the speaker unit 32, the first passive radiator 33, and the second passive radiator 34, and the second cabinet 36 including the second wall section 362 opposed to the rear of the second passive radiator 34, including the opening section 41 adjacent to the first passive radiator 33 along the direction crossing the center axis C, and forming the opened acoustic space S2 between the second passive radiator 34 and the second wall section 362. The second passive radiator 34 is located in the front with respect to the first imaginary surface K1 passing the first wall section 351 of the first cabinet 35. The second wall section 362 of the second cabinet 36 does not project to the rear of the first wall section 351.

When a sound signal including a lower register component is supplied to the speaker unit 32, the first passive radiator 33 and the second passive radiator 34 vibrate according to the amplitude of the vibrating plate 38 of the speaker unit 32 and generate action for intensifying a bass output. That is, when the vibrating plate 38 moves in the inner side direction of the sealed acoustic space S1, since the internal pressure of the sealed acoustic space S1 rises, both of the first passive radiator 33 and the second passive radiator 34 move to the outer side. At this time, since the internal pressure of the sealed acoustic space S1 becomes lower than the original state, force for moving the vibrating plate 38 of the speaker unit 32 further in the inner side direction is generated. Such action is conspicuous near a resonance frequency of the passive radiators 33 and 34. Therefore, when the resonance frequency of the passive radiators 33 and 34 is set lower than the lowest resonance frequency of the speaker unit 32, conversion efficiency of the speaker unit 32 is improved with respect to an input signal in the lower register and the bass output is intensified.

On the other hand, a change in the internal pressure of the opened acoustic space S2 due to the vibration of the second passive radiator 34 is extremely small because the opening section 41 to an external space is provided. Therefore, by optimizing design of the second cabinet 36 and setting the impedance of the opened acoustic space S2 to a desired value, a bass wave emitted from the back of the speaker unit 32 and transmitted as a vibration wave of the second passive radiator 34 can be effectively emitted to the external space from the opening section 41. Consequently, it is possible to improve reproducibility in the lower register.

In particular, in the speaker device 31 in this embodiment, the first passive radiator 33 and the second passive radiator 34 are disposed to be opposed to each other. Therefore, at an instance when the first passive radiator 33 moves toward the outer side of the sealed acoustic space S1, the second passive radiator 34 also moves toward the outer side of the sealed acoustic space S1. At an instance when the first passive radiator 33 moves toward the inner side of the sealed acoustic space S1, the second passive radiator 34 also moves toward the inner side of the sealed acoustic space S1. In this way, the moving direction of the first passive radiator 33 and the moving direction of the second passive radiator 34 are opposite directions. Therefore, vibrations transmitted to the first cabinet 35 and the second cabinet 36 are canceled each other to decrease. Consequently, it is possible to suppress chattering sound involved in the vibrations of the passive radiators 33 and 34.

The second passive radiator 34 is located in the front with respect to the first imaginary surface K1 passing the first wall section 351 of the first cabinet 35. The second wall section 362 of the second cabinet 36 does not project to the rear with respect to the first wall section 351. Therefore, it is possible to reduce the dimension in the depth direction of the speaker device 31 and achieve a reduction in the size of the speaker device 31. Further, since the speaker unit 32 and the first passive radiator 33 are disposed side by side in the Y-axis direction, it is possible to use a passive radiator having larger dimensions as the passive radiators 33 and 34 while reducing the dimension in the depth direction of the speaker device 31. It is possible to improve an intensifying effect for the lower register.

In the speaker device 31 in this embodiment, the second wall section 362 of the second cabinet 36 is located in the front with respect to the first imaginary surface K1.

With this configuration, since the dimension in the depth direction of the second cabinet 36 is smaller than the dimension in the depth direction of the first cabinet 35, it is possible to effectively use a space in the rear of the second cabinet 36 when the speaker device 31 is incorporated in other equipment.

In the speaker device 31 in this embodiment, the second cabinet 36 includes the duct 43 that extends along the extending direction of the second passive radiator 34, bends at the end portion on the opposite side of the end portion on the side where the speaker unit 32 of the second passive radiator 34 is located, and forms the opened acoustic space S2 communicating with the opening section 41.

With this configuration, it is possible to reduce the dimension in the depth direction of the second cabinet 36 while securing a space required for the opened acoustic space S2.

In the speaker device 31 in this embodiment, the opened acoustic space S2 is located on the second imaginary surface K2 parallel to the extending direction of the second passive radiator 34 and passing the rear end portion of the speaker unit 32.

With this configuration, it is possible to reduce an increase in the dimension in the depth direction of the opened acoustic space S2.

Second Embodiment

A second embodiment of the present disclosure is explained below with reference to FIG. 2.

Since a basic configuration of a speaker device in the second embodiment is the same as the basic configuration in the first embodiment, explanation concerning the basic configuration is omitted and differences from the first embodiment are explained.

Figure 2:
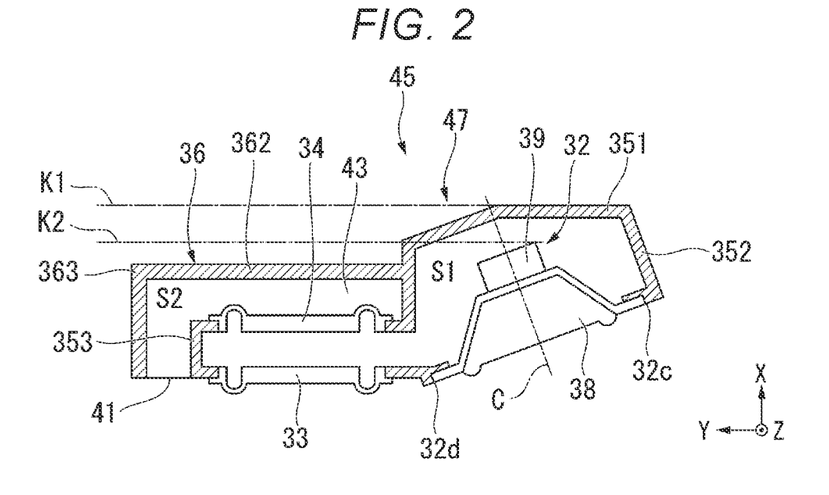
FIG. 2 is a schematic configuration diagram of a speaker device in a second embodiment.

FIG. 2 is a schematic configuration diagram of a speaker device 45 in the second embodiment.

In FIG. 2, components common to FIG. 1 referred to in the first embodiment are denoted by the same reference numerals and signs and explanation of the components is omitted.

As shown in FIG. 2, the speaker device 45 in this embodiment includes the speaker unit 32, the first passive radiator 33, the second passive radiator 34, a first cabinet 47, and the second cabinet 36.

In this embodiment, the speaker unit 32 is disposed such that the center axis C of the speaker unit 32 inclines in a direction further away from the first passive radiator 33 (the −Y direction) toward the front from the rear (the −X direction). In other words, the speaker unit 32 is disposed to incline such that an end portion 32c on the far side from the first passive radiator 33 is located further in the rear than an end portion 32d on the near side to the first passive radiator 33 in the front end face of the speaker unit 32.

In this embodiment, the second imaginary surface K2 parallel to the extending direction of the second passive radiator 34 and passing the rear end portion of the speaker unit 32 is located in the rear with respect to the opened acoustic space S2. In the case of this embodiment, since the speaker unit 32 is inclined, the rear end portion of the speaker unit 32 is a corner portion of the yoke 39. According to the inclination of the speaker unit 32, the shape of the first cabinet 47 is different from the shape of the first cabinet 35 in the first embodiment. However, the shape of the first cabinet 47 is not particularly limited. The other components of the speaker device 45 are the same as the components in the first embodiment.

Effects of the Second Embodiment

In the speaker device 45 in this embodiment, the same effects as the effects of the first embodiment can be obtained, for example, it is possible to improve reproducibility in the lower register, it is possible to suppress chattering sound that occurs from the cabinets, and it is possible to reduce the dimension in the depth direction of the speaker device 45.

In the speaker device 45 in this embodiment, the center axis C of the speaker unit 32 is inclined in the direction further away from the first passive radiator toward the front from the rear.

With this configuration, it is possible to improve the spread of sound, for example, when the speaker device 45 is set at both the left and right ends of other equipment.

In the speaker device 45 in this embodiment, the second imaginary surface K2 parallel to the extending direction of the second passive radiator 34 and passing the rear end portion of the speaker unit 32 is located in the rear with respect to the opened acoustic space S2.

In the case of this embodiment, since the speaker unit 32 is inclined, it is likely that the dimension in the depth direction of the first cabinet 47 is larger than when the speaker unit 32 is not inclined. Even in that case, with the configuration explained above, it is possible to maintain the small dimension in the depth direction of the second cabinet 36. It is possible to effectively use the space in the rear of the second cabinet 36.

Third Embodiment

A third embodiment of the present disclosure is explained below with reference to FIG. 3.

In the third embodiment, a projector including the speaker device in the first embodiment is explained.

Figure 3:
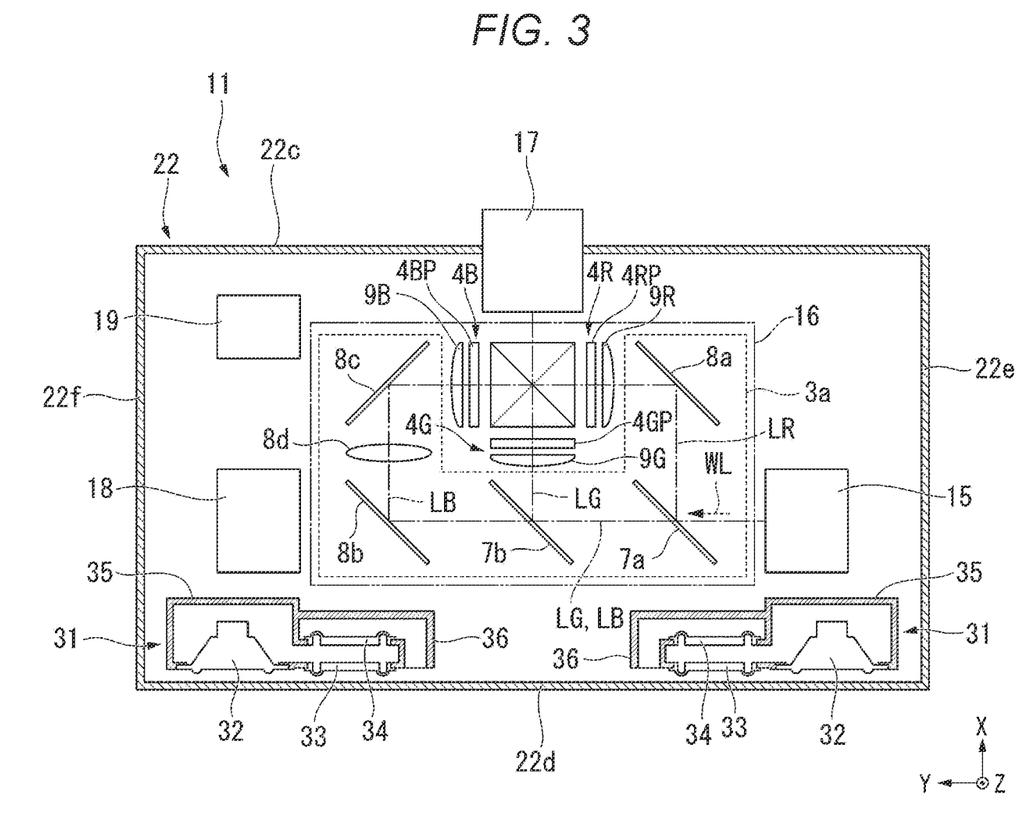
FIG. 3 is a schematic configuration diagram of a projector in a third embodiment.
Figure 4:
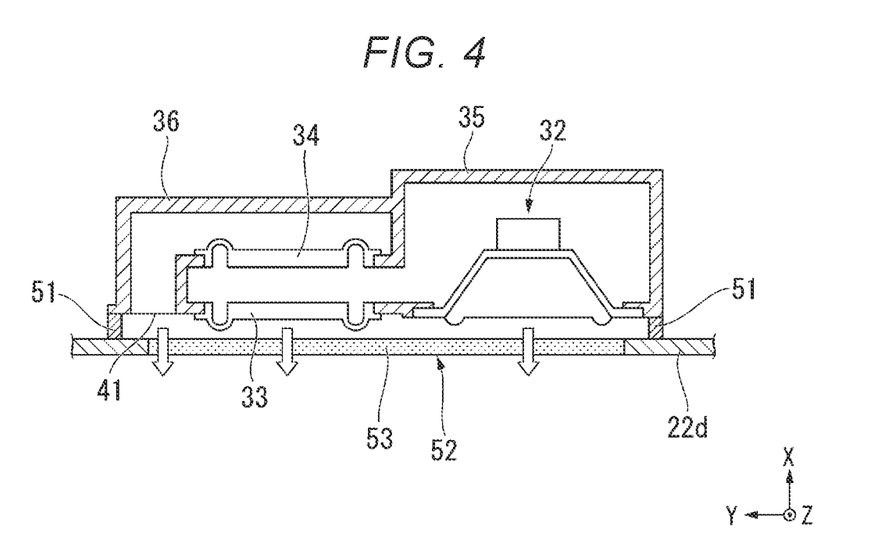
FIG. 4 is an enlarged diagram of a part where a speaker device is housed in the projector.

FIG. 3 is a schematic configuration diagram of a projector 11 in the third embodiment. FIG. 4 is an enlarged diagram of a part where the speaker device 31 is housed in the projector 11.

In FIGS. 3 and 4, components common to FIG. 1 referred to in the first embodiment are denoted by the same reference numerals and signs and explanation of the components is omitted.

As shown in FIG. 3, the projector 11 in this embodiment includes an exterior case 22, an illumination unit 15, an image forming unit 16, a projection optical unit 17, a power supply unit 18, a control unit 19, and the speaker device 31.

The exterior case 22 is a box-like member having a generally rectangular parallelepiped shape and hollow on the inside. The exterior case 22 includes six wall sections including a front wall section 22c, a rear wall section 22d, a right sidewall section 22e, a left sidewall section 22f, an upper wall section, and a lower wall section. The exterior case 22 houses the illumination unit 15, the image forming unit 16, the projection optical unit 17, the power supply unit 18, the control unit 19, and the speaker device 31.

Although not shown in FIG. 3, the illumination unit 15 includes, for example, a laser light source and a wavelength conversion element. The illumination unit 15 condenses, with a condensing lens, as excitation light, blue laser light emitted from a laser light source, makes the blue laser light incident on the wavelength conversion element including a phosphor, and emits white light formed by the blue laser light and yellow fluorescent light. The illumination unit 15 is not limited to the configuration including the laser light source and the wavelength conversion element. For example, a configuration including the laser light source alone or a configuration including an LED (Light Emitting Diode) or a light source lamp of a discharge type may be applied as the illumination unit 15. The illumination unit 15 may include a heat radiating member such as a heat sink that emits heat generated by a light emission source to the outside.

The image forming unit 16 includes a color separation optical system 3a, a light modulation device 4R, a light modulation device 4G, a light modulation device 4B, and a light combination optical system 5. The image forming unit 16 generates image light from light emitted from the illumination unit 15.

The color separation optical system 3a separates white light WL emitted from the illumination unit 15 into red light LR, green light LG, and blue light LB. The color separation optical system 3a includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the white light WL emitted from the illumination unit 15 into the red light LR and mixed light of the green light LG and the blue light LB. The first dichroic mirror 7a reflects the red light LR and transmits the green light LG and the blue light LB. The second dichroic mirror 7b separates the mixed light of the green light LG and the blue light LB into the green light LG and the blue light LB. The second dichroic mirror 7b reflects the green light LG and transmits the blue light LB.

The first reflection mirror 8a is disposed in an optical path of the red light LR. The first reflection mirror 8a reflects, toward the light modulation device 4R, the red light LR reflected by the first dichroic mirror 7a. The second reflection mirror 8b and the third reflection mirror 8c are disposed in an optical path of the blue light LB. The second reflection mirror 8b and the third reflection mirror 8c guide the blue light LB transmitted through the second dichroic mirror 7 to the light modulation device 4B.

The light modulation device 4R is configured from a liquid crystal panel 4RP and polarizing plates (not shown) respectively provided on an incidence side and an emission side of the liquid crystal panel 4RP. The light modulation device 4G is configured from a liquid crystal panel 4GP and polarizing plates (not shown) respectively provided on an incidence side and an emission side of the liquid crystal panel 4GP. The light modulation device 4B is configured from a liquid crystal panel 4BP and polarizing plates (not shown) respectively provided on an incidence side and an emission side of the liquid crystal panel 4BP. The light modulation device 4R modulates, according to an image signal, the red light LR in light emitted from a light source unit. The light modulation device 4G modulates, according to an image signal, the green light LG in the light emitted from the light source unit. The light modulation device 4B modulates, according to an image signal, the blue light LB in the light emitted from the light source unit. Consequently, the light modulation devices 4R, 4G, and 4B form image lights corresponding to the color lights.

On a light incidence side of the light modulation device 4R, a field lens 9R that collimates the red light LR made incident on the light modulation device 4R is disposed. On a light incidence side of the light modulation device 4G, a field lens 9G that collimates the green light LG made incident on the light modulation device 4G is disposed. On a light incidence side of the light modulation device 4B, a field lens 9B that collimates the blue light LB made incident on the light modulation device 4B is disposed.

The light combination optical system 5 is configured from a substantially cubical cross dichroic prism. The light combination optical system 5 combines the color image lights emitted from the light modulation devices 4R, 4G, and 4B. The light combination optical system 5 emits the combined image light toward the projection optical unit 17.

The projection optical unit 17 enlarges and projects image light emitted from the image forming unit 16 toward a screen (not shown). The light is projected from the projection optical unit 17, whereby an enlarged color image is displayed on the screen. The projection optical unit 17 includes a plurality of projection lenses (not shown). The number of projection lenses is not particularly limited.

The power supply unit 18 supplies, to the illumination unit 15, electric power supplied from an external power supply coupled to the projector 11.

The control unit 19 is configured from a circuit board that controls the sections of the projector 11. Various wires are formed and various electronic components are mounted on the control unit 19.

The speaker device 31 is disposed along the inner surface of the rear wall section 22d of the exterior case 22. That is, in the speaker device 31, the speaker unit 32 and the first passive radiator 33 are disposed side by side along the inner surface of the rear wall section 22d of the exterior case 22. Two speaker devices 31 are respectively provided in two parts on the left and the right separated from each other in a part extending along the inner surface of the rear wall section 22d. The two speaker devices 31 are symmetrically disposed in a direction in which sides where pairs of passive radiators 33 and 34 are disposed are opposed to each other.

As shown in FIG. 4, sealing members 51 are provided between the first cabinet 35 and the rear wall section 22d and between the second cabinet 36 and the rear wall section 22d.

Consequently, a space between the speaker device 31 and the rear wall section 22*d* is sealed by the sealing members 51. The sealing members 51 are formed of an elastic body such as rubber.

An opening section 52 is provided in a region opposed to the speaker unit 32, the first passive radiator 33, and the opening section 41 in the rear wall section 22*d* of the exterior case 22. A speaker cover 53 that closes the opening section 52 is provided in the opening section 52. The speaker cover 53 is formed of a material for causing air to permeate such as a metal plate, a plastic plate, a speaker net, or a fabric in which a large number of holes are provided.

Effects of the Third Embodiment

The projector 11 in this embodiment includes the speaker device 31 and the exterior case 22 that houses the speaker device 31. The speaker device 31 is disposed along the inner surface of the exterior case 22.

With the projector 11 in this embodiment, since vibration of the air emitted from the speaker device 31 is less easily transmitted to the exterior case 22, it is possible to suppress occurrence of scattering sound. Since the dimension in the depth direction of the speaker device 31 is small, the speaker device 31 can be compactly housed in a space other than parts where various units are disposed in the exterior case 22. Consequently, it is possible to realize a small projector 11 excellent in sound quality in the lower register.

Further, in the case of this embodiment, since the sealing members 51 formed of the elastic body are provided between the speaker device 31 and the rear wall section 22*d*, vibration from the speaker device 31 is absorbed by the sealing members 51. The vibration is much less easily transmitted to the exterior case 22.

Fourth Embodiment

A fourth embodiment of the present disclosure is explained below with reference to FIG. 5.

In the fourth embodiment, a projector including the speaker device in the second embodiment is explained. A basic configuration of the projector in the fourth embodiment is the same as the basic configuration of the projector in the third embodiment. Therefore, detailed explanation of the basic configuration of the projector is omitted.

Figure 5:
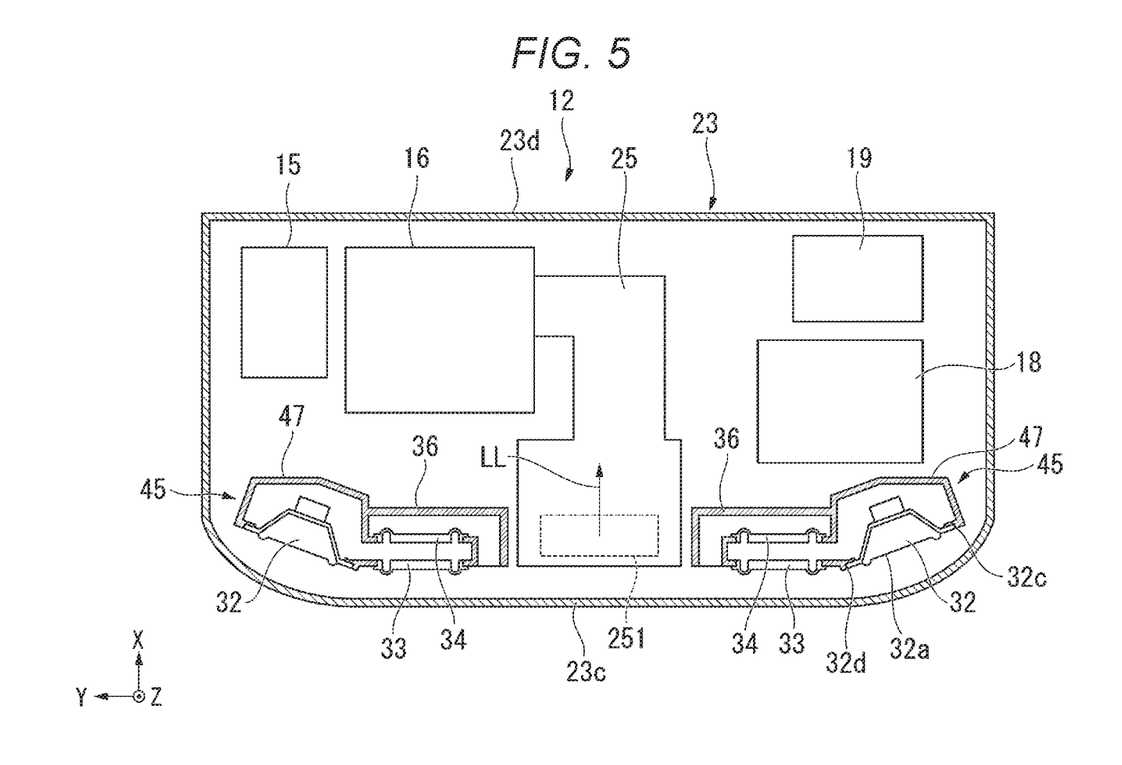
FIG. 5 is a schematic configuration diagram of a projector in a fourth embodiment.

FIG. 5 is a schematic configuration diagram of a projector 12 in the fourth embodiment.

In FIG. 5, components common to the drawings referred to in the first embodiment and the third embodiment are denoted by the same reference numerals and signs and explanation of the components is omitted.

As shown in FIG. 5, the projector 12 in this embodiment includes an exterior case 23, the illumination unit 15, the image forming unit 16, a projection optical unit 25, the power supply unit 18, the control unit 19, and the speaker device 45.

The projection optical unit 25 includes a reflection mirror 251. The projection optical unit 25 reflects, with the reflection mirror 251, image light LL emitted from a projection lens (not shown) and emits the image light LL toward a rear wall section 23*d* side of the exterior case 23. That is, the projector 12 in this embodiment is an ultrashort focus projector including the projection optical unit 25 of a reflection type.

The speaker device 45 is disposed along the inner surface of a front wall section 23*c* of the exterior case 23. That is, in the speaker device 45, the speaker unit 32 and the first passive radiator 33 are disposed side by side along the inner surface of the front wall section 23*c* of the exterior case 23. Two speaker devices 45 are respectively provided in two parts on the left and the right separated from each other in a part extending along the inner surface of the front wall section 23*c*. The two speaker devices 45 are symmetrically disposed in a direction in which sides where pairs of passive radiators 33 and 34 are disposed are opposed to each other.

As explained in the second embodiment, the speaker device 45 in this embodiment is inclined such that the end portion 32*c* on the far side from the first passive radiator 33 is located further in the rear than the end portion 32*d* on the near side to the first passive radiator 33 in a front end face 32*a* of the speaker unit 32. Therefore, in this embodiment, the inner surface of a portion where the speaker device 45 is set in the front wall section 23*c* of the exterior case 23 is inclined along the front end face 32*a* of the speaker unit 32. In the case of this embodiment, both the end portions of the front wall section 23*c* is inclined in a curved surface shape. However, both the end portions of the front wall section 23*c* may be inclined in a flat surface shape. The other components of the projector 12 are the same as the components in the third embodiment.

Effects of the Fourth Embodiment

In this embodiment, the same effects as the effects of the third embodiment can be obtained, for example, it is possible to suppress occurrence of chattering sound and it is possible to realize a small projector 12 excellent in sound quality in the lower register.

In the projector 12 in this embodiment, the inner surface of the exterior case 23 is inclined along the front end face 32*a* of the inclined speaker unit 32.

With this configuration, the speaker device 45 including the inclined speaker unit 32 can be compactly housed in the exterior case 23 of the projector 12. It is possible to improve the spread of sound.

In particular, a projector mounted with a reflection-type projection optical unit is an ultrashort focus-type projector. Therefore, the projector has characteristics that a projection distance is short and the size in the depth direction of the projector needs to be reduced and, moreover, a unit of an optical system such as an image forming unit is large in a major axis direction (the left-right direction) of the projector. Therefore, in a region on the opposite side of the image forming unit across the projection optical unit, a space for housing a control unit including a circuit board and an IF (interface) cable is necessary. The size in the major axis direction tends to be large and, on the other hand, the size in the depth direction tends to be small. Therefore, it is suitable to use the speaker device 45 in this embodiment. A merit of using the speaker device 45 in this embodiment is large.

Fifth Embodiment

A fifth embodiment of the present disclosure is explained with reference to FIG. 6.

A basic configuration of a projector in the fifth embodiment is the same as the basic configuration of the projector in the fourth embodiment. The fifth embodiment is different from the fourth embodiment in that a tweeter speaker is added.

Figure 6:
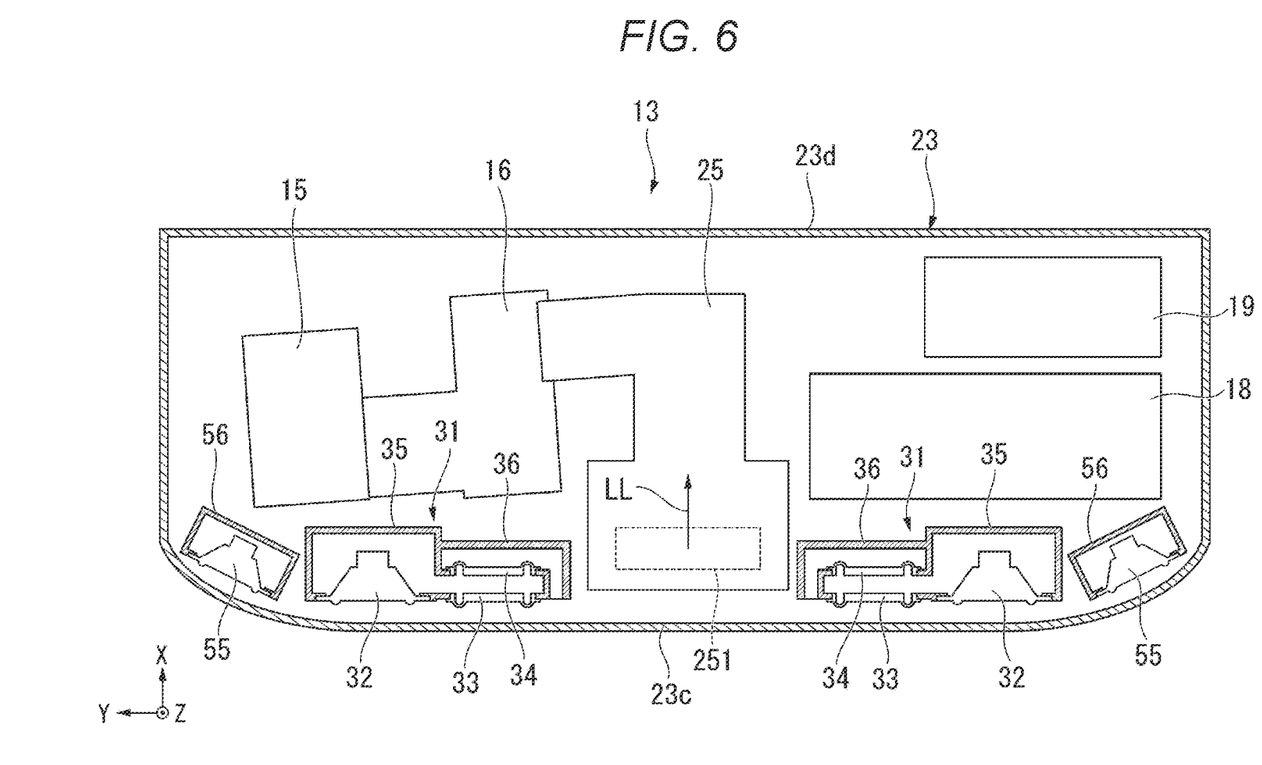
FIG. 6 is a schematic configuration diagram of a projector in a fifth embodiment.

FIG. 6 is a schematic configuration diagram of a projector 13 in the fifth embodiment.

In FIG. 6, components common to FIG. 5 referred to in the fourth embodiment are denoted by the same reference numerals and signs and explanation of the components is omitted.

As shown in FIG. 6, the projector 13 in this embodiment includes the exterior case 23, the illumination unit 15, the image forming unit 16, the projection optical unit 17, the power supply unit 18, the control unit 19, the speaker device 31 in the first embodiment, and tweeter speakers 55. The speaker device 45 in the second embodiment may be used instead of the speaker device 31 in the first embodiment.

The tweeter speakers 55 are respectively provided on the outer sides of the speaker devices 31 provided in the two parts on the left and the right of the exterior case 23. The tweeter speakers 55 mainly emit sound in the middle and higher registers. On the other hand, the speaker devices 31 in this embodiment mainly emits sound in the lower register. That is, the speaker units 32 are configured by woofer speakers. Cabinets 56 of the tweeter speakers 55 may be separate from first cabinets 35 and second cabinets 36 of the speaker devices 31 or may be integrated with the first cabinets 35 and the second cabinets 36.

Effects of the Fifth Embodiment

In this embodiment, the same effects as the effects in the fourth embodiment can be obtained, for example, it is possible to suppress occurrence of scattering sound and it is possible to realize a small projector 13 excellent in sound quality in the lower register.

In the projector 13 in this embodiment, the tweeter speakers 55 that mainly emit sound in the middle and higher registers are added and share functions with the speaker devices 31 that mainly emit sound in the lower register. Therefore, it is possible to further improve reproducibility of sound.

The two speaker units 32 disposed in separate positions may be controlled as one woofer speaker to configure a 2.1 Ch speaker system. By controlling the two speaker units 32 disposed in the separate positions as one woofer speaker that mainly emits sound in the lower register, it is possible to realize a speaker system having high reproducibility in the lower register as in the case in which a large-diameter woofer speaker is used. In the projector 13 in this embodiment, when there is restriction in cost and a space, one tweeter speaker 55 on the left or the right may only be added. In that case, it is possible to avoid an increase in cost and avoid an increase in a space occupied by the speaker system.

The technical scope of the present disclosure is not limited to the embodiments explained above. It is possible to add various changes in a range not departing from the gist of the present disclosure.

For example, the position of the opening section in the speaker devices in the embodiments may be changed.

Figure 7:
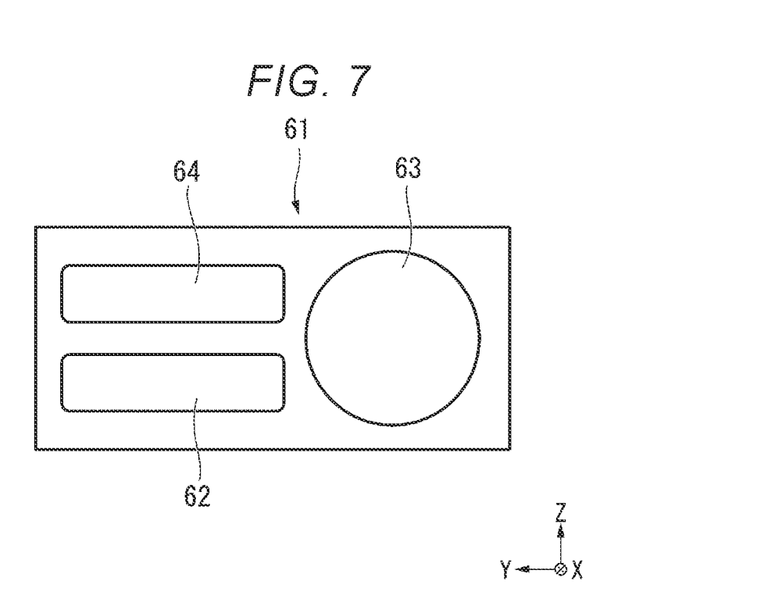
FIG. 7 is a front view of a speaker device in a modification.

FIG. 7 is a front view of a speaker device 61 in a modification.

In the speaker devices 31 and 45 in the embodiments, the opening section 41 is provided on the side of the first passive radiator 33 along the direction (the left-right direction) in which the speaker unit 32 and the first passive radiator 33 are disposed side by side. In contrast, in the speaker device 61 in the modification, as shown in FIG. 7, an opening section 62 is provided below a first passive radiator 64 in a direction (the up-down direction) crossing a direction in which a speaker unit 63 and the first passive radiator 64 are disposed side by side. The opening section 62 may be provided above the first passive radiator 64. In this configuration, effects equivalent to the effects of the speaker devices 31 and 45 in the embodiments can be obtained.

In the embodiments, the second wall section of the second cabinet is located further in the front than the first imaginary surface. However, the second wall section of the second cabinet may be located on the first imaginary surface because the second wall section only has to not project to the rear with respect to the first wall section. That is, the first wall section and the second wall section may be located on the same plane. With this configuration, effects equivalent to the effects of the speaker devices in the embodiments can be obtained.

Besides, specific configurations such as the numbers, the dispositions, the shapes, and the materials of the various components configuring the speaker devices and the projectors are not limited to the embodiments and can be changed as appropriate.

A speaker device according to an aspect of an embodiment may have the following configuration.

The speaker device according to the aspect of the embodiment includes: a speaker unit including a vibrating plate, a yoke, and a center axis passing the vibrating plate and the yoke; a first passive radiator disposed adjacent to the vibrating plate along a direction crossing the center axis; a second passive radiator located in, when a direction from the vibrating plate to the yoke along the center axis is represented as a first direction and a direction from the yoke to the vibrating plate along the center axis is represented as a second direction, the first direction with respect to the first passive radiator and disposed to be opposed to the first passive radiator; a first cabinet including a first wall section opposed to the yoke in the first direction and forming a sealed acoustic space common to the speaker unit, a first passive radiator, and the second passive radiator; and a second cabinet including a second wall section opposed to the second passive radiator in the first direction, including an opening section adjacent to the first passive radiator along a direction crossing the center axis, and forming an opened acoustic space between the second passive radiator and the second wall section. The second passive radiator is located in the second direction with respect to a first imaginary surface passing the first wall section of the first cabinet. The second wall section of the second cabinet does not project in the first direction with respect to the first wall section.

In the speaker device according to the aspect of the embodiment, the second wall section of the second cabinet may be located in the second direction with respect to the first imaginary surface.

In the speaker device according to the aspect of the embodiment, the second cabinet may include a duct that extends along an extending direction of the second passive radiator, bends at an end portion on an opposite side of an end portion on a side where the speaker unit of the second passive radiator is located, and forms the opened acoustic space communicating with the opening section.

In the speaker device according to the aspect of the embodiment, the opened acoustic space may be located on a second imaginary surface parallel to an extending direction of the second passive radiator and passing an end portion on the first direction side of the speaker unit.

In the speaker device according to the aspect of this embodiment, the center axis of the speaker unit may be inclined in a direction further away from the first passive radiator toward the second direction.

In the speaker device according to the aspect of this embodiment, a second imaginary surface parallel to an extending direction of the second passive radiator and passing an end portion on the first direction side of the speaker unit may be located in the first direction with respect to the opened acoustic space.

A projector according to an aspect of an embodiment may have the following configuration.

The projector according to the aspect of the embodiment includes: the speaker device according to the aspect of the embodiment; and an exterior case housing the speaker device. The speaker device is disposed along an inner surface of the exterior case.

A projector according to an aspect of an embodiment includes: the speaker device according to the aspect of the embodiment; and an exterior case housing the speaker device. The speaker device is disposed along an inner surface of the exterior case. The inner surface is inclined along an end face on the second direction side of the speaker unit in which the center axis is inclined in the direction further away from the first passive radiator toward the second direction.

What is claimed is:

1. A speaker device comprising:
   a speaker unit including a vibrating plate, a yoke, and a center axis passing the vibrating plate and the yoke;
   a first passive radiator disposed adjacent to the vibrating plate along a direction crossing the center axis;
   a second passive radiator located in, when a direction from the vibrating plate to the yoke along the center axis is represented as a first direction and a direction from the yoke to the vibrating plate along the center axis is represented as a second direction, the first direction with respect to the first passive radiator and disposed to be opposed to the first passive radiator;
   a first cabinet including a first wall section opposed to the yoke in the first direction and forming a sealed acoustic space common to the speaker unit, a first passive radiator, and the second passive radiator; and
   a second cabinet including a second wall section opposed to the second passive radiator in the first direction, including an opening section adjacent to the first passive radiator along a direction crossing the center axis, and forming an opened acoustic space between the second passive radiator and the second wall section, wherein
   the second passive radiator is located in the second direction with respect to a first imaginary surface passing the first wall section of the first cabinet, and
   the second wall section of the second cabinet does not project in the first direction with respect to the first wall section.

2. The speaker device according to claim 1, wherein the second wall section of the second cabinet is located in the second direction with respect to the first imaginary surface.

3. The speaker device according to claim 1, wherein the second cabinet includes a duct that extends along an extending direction of the second passive radiator, bends at an end portion on an opposite side of an end portion on a side where the speaker unit of the second passive radiator is located, and forms the opened acoustic space communicating with the opening section.

4. The speaker device according to claim 1, wherein the opened acoustic space is located on a second imaginary surface parallel to an extending direction of the second passive radiator and passing an end portion on the first direction side of the speaker unit.

5. The speaker device according to claim 1, wherein the center axis of the speaker unit is inclined in a direction further away from the first passive radiator toward the second direction.

6. The speaker device according to claim 5, wherein a second imaginary surface parallel to an extending direction of the second passive radiator and passing an end portion on the first direction side of the speaker unit is located in the first direction with respect to the opened acoustic space.

7. A projector comprising:
   the speaker device according to claim 5; and
   an exterior case housing the speaker device, wherein
   the speaker device is disposed along an inner surface of the exterior case, and
   the inner surface is inclined along an end face on the second direction side of the speaker unit inclined in a direction in which the center axis is further away from the first passive radiator toward the second direction.

8. A projector comprising:
   the speaker device according to claim 1; and
   an exterior case housing the speaker device, wherein
   the speaker device is disposed along an inner surface of the exterior case.

* * * * *